Figure 1:
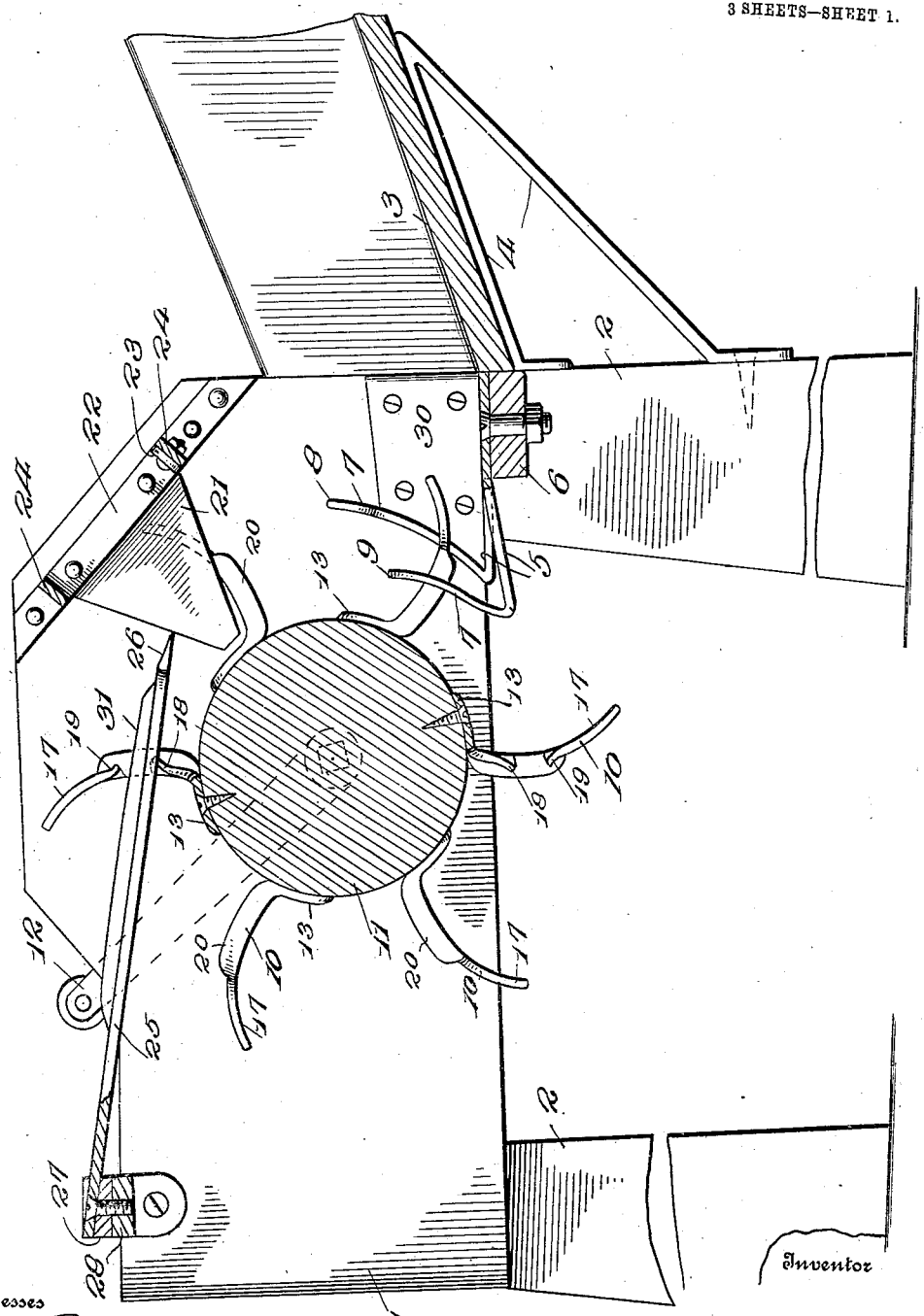

E. Q. COUCH.
POTATO CUTTER.
APPLICATION FILED MAR. 20, 1908.

917,849.

Patented Apr. 13, 1909.
3 SHEETS—SHEET 1.

Witnesses

Inventor
Eugene Q. Couch
By Abra P Lacey, Attorneys

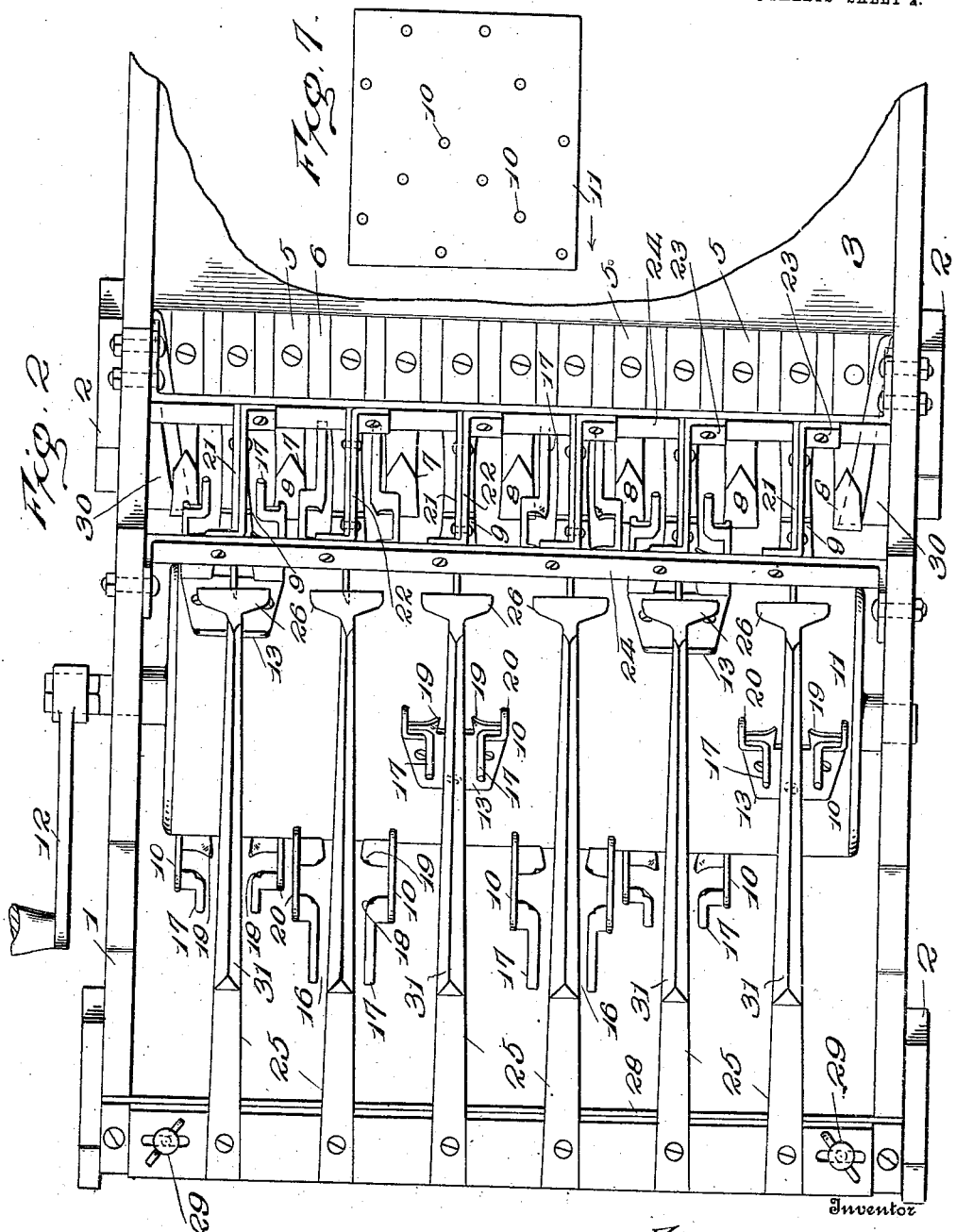

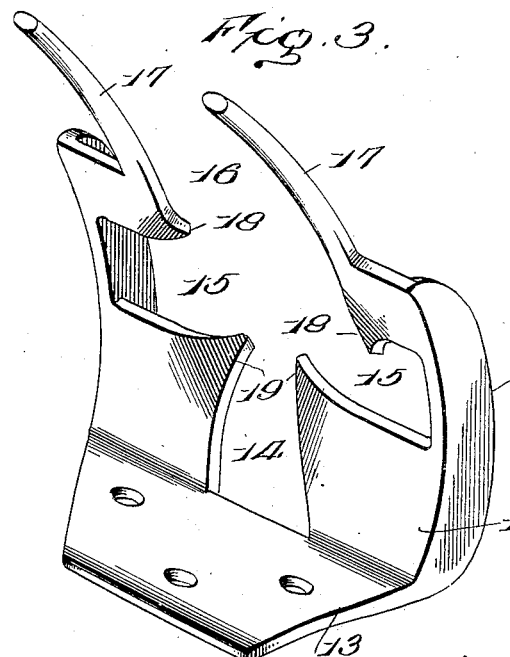
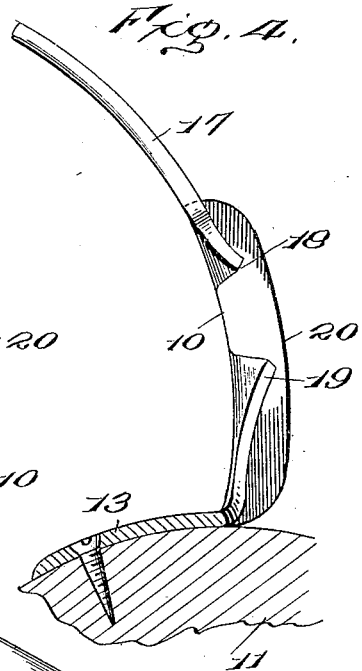
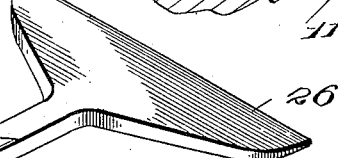
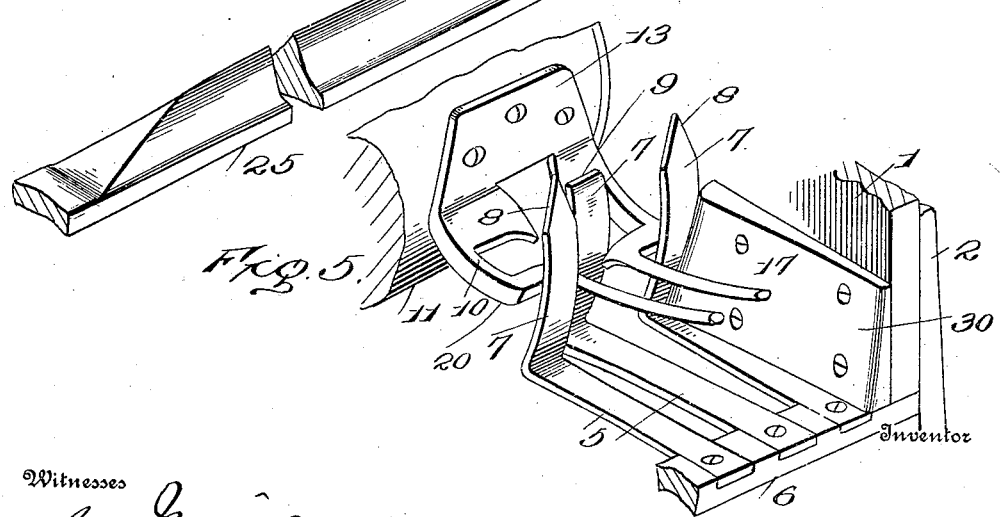

UNITED STATES PATENT OFFICE.

EUGENE Q. COUCH, OF JONES, OKLAHOMA.

POTATO-CUTTER.

No. 917,849.  Specification of Letters Patent.  Patented April 13, 1909.

Application filed March 20, 1908. Serial No. 422,283.

*To all whom it may concern:*

Be it known that I, EUGENE Q. COUCH, a citizen of the United States, residing at Jones, in the county of Oklahoma and State of Oklahoma, have invented certain new and useful Improvements in Potato-Cutters, of which the following is a specification.

This invention has for its object a simple, durable and efficient construction of machine for cutting seed potatoes, and the invention consists in certain constructions, arrangements and combinations of the parts that I shall hereinafter fully describe and then point out the novel features in the appended claims.

For a full understanding of the invention, reference is to be had to the following description and accompanying drawings, in which:

Figure 1 is a longitudinal sectional view through my improved potato cutter; Fig. 2 is a top plan view thereof; Fig. 3 is a detail perspective view of one of the pickers employed; Fig. 4 is a transverse sectional view through one of the pickers, showing it attached to a portion of the revoluble cylinder which carries the pickers; Fig. 5 is a detail perspective view of one of the pickers and a portion of the receiving end of the machine with which said picker is arranged to coact; Fig. 6 is a detail perspective view of one of the slicing elements; and, Fig. 7 is a projected or diagrammatic view of the cylinder illustrating the location of the pickers on the periphery thereof.[b]

Corresponding and like parts are referred to in the following description and indicated in all the views of the drawings by the same reference characters.

The supporting framework of my improved potato cutting machine may be of any desired construction, design, or size, according to the capacity that it is desired the machine shall attain, and in the present instance, I show such framework as embodying two side sills 1 supported in an elevated position upon legs 2.

3 designates a hopper which may be of any desired construction, or size, and which may be secured, if desired, in any way to the receiving end of the machine, as by angular brackets 4 illustrated in Fig. 1.

A series of transversely spaced fingers 5 are mounted in the receiving end of the machine between the two side sills 1, contiguous to the discharge end of the hopper 3, said fingers being bolted or otherwise secured in countersunk or flush relation upon the upper face of a transversely extending supporting bar 6 which serves as a brace for the supporting framework as well as a support for said fingers. All of the fingers 5 extend inwardly from the receiving end of the machine and each finger is provided with an upwardly turned inner end 7, preferably reversely curved, as best illustrated in Fig. 1. Every other finger 5, commencing with the end fingers of the series, is oppositely beveled or pointed at the extremity of its upwardly turned end, as indicated at 8, and every other, or alternating finger, between every two pointed extremities is formed with a preferably blunt or square extremity, as indicated at 9. Each of such last named fingers preferably extends inwardly farther than and is depressed below the plane of the two adjacent fingers, so as to form therewith a pocket, the fingers as a whole, with the particular arrangement thereof just described, constituting a slatted receiving trough into which the potatoes are intended to roll from the hopper 3, said trough being formed at equidistant intervals with a series of pockets formed by one depressed finger and two adjacent fingers, as above noted.

A plurality of pickers 10 is secured in definite spaced relation to each other, upon the periphery of a revoluble carrier 11, which, in the present instance, is in the form of a cylinder extending transversely of the supporting framework and journaled to rotate about its longitudinal central axis that is horizontally disposed as shown. The cylinder 11 may be turned by any desired means, as by a crank handle 12 secured to one end of its shaft.

Each picker 10 is formed with an angularly disposed web portion 13 by which it is designed to be secured by screws or similar fastening devices to the periphery of the cylinder 11 in such a manner that the main or body portion of the picker shall as a whole project outwardly in a radial direction from the cylinder. The body portion of each picker is formed with a cruciform opening, embodying a slot 14 opening outwardly from the web 13 into two laterally extending slots 15, these latter bordering upon an outwardly opening slot 16 in alinement with the slot 14 and defined by two rod-like and somewhat curved tines 17 projecting outwardly from the body portion of the picker. Said body portion is preferably strengthened along its side edges by angularly disposed flanges 20.

The pickers 10 are so disposed upon the periphery of the cylinder 11, that in the rotation of the cylinder, the pickers will sweep upwardly and rearwardly through the slatted trough at the receiving end of the main framework, the tines 17 passing through the spaces between one of the depressed and elongated fingers 5 and its two coacting adjacent fingers, the pointed upturned extremities 7 of the latter being passed by the shoulders formed at the outer edge of the body portion on the outer sides of the tines 17. In this manner, a potato, in the trough formed as above described, will be caught up by the tines and be stripped past the two adjacent pointed extremities 8 and the blunt extremity 9 and will lodge in the picker 10, it being particularly noted that the body portion of the picker is depressed at the juncture of the slots 15 and 16 and at the juncture of the slots 15 and 14, so as to produce depending lips 18 and 19 which together serve as a pocket, with their inclosed open space, to insure that the potato will lodge properly on the picker and be carried upwardly and rearwardly thereby.

Coacting with the several pickers 10 and located in registry with the radially extending portions of the openings thereof formed by the slots 14 and 16, are blades 21 which, in the present instance are of V-shape and which are secured at their upper edges by rivets, bolts, or other fastenings, to cross strips 22, the ends of which latter are turned in opposite directions, as indicated at 23 and riveted or otherwise secured to the supporting bars 24 that are fastened at their ends to the side sills 1, thereby serving as braces for the side sills as well as supports for the blades. The inner ends of the blades 21 terminate slightly short of the periphery of the cylinder 11, as best seen in Fig. 1. As the potatoes are carried upwardly by the pickers 10, it is obvious that they will be sliced in two parts by the blades 21.

In order to slice the potatoes in quarters, and to produce a slicing cut in a substantially horizontal plane at right angles to the vertical cut formed by the blades 21, I have provided a series of knife bars 25 which project forwardly from the rear end of the supporting framework and which are provided at their forward ends with laterally elongated slicing edges 26 in contact with the rear edges of the blades 21, and in alinement with the slots 15 of the respective pickers. The knife bars 25 are secured at their rear ends in spaced relation to each other upon a transversely extending strip 27 which in turn is bolted or otherwise detachably secured to a cross brace 28, as by bolts indicated at 29, so that the entire series of knife bars 25 may be removed from the machine when it is desired to only cut the potatoes in half, as when comparatively small potatoes are being sliced.

In the practical operation of my improved potato cutter, it will be understood that the potatoes will roll from the hopper 3 into the receiving trough at one end of the apparatus and as the cylinder 11 is rotated, the pickers 10 will sweep upwardly through the receiving trough and will act successively to carry the potatoes one at a time upwardly and rearwardly against the blades 21 to effect a vertical slicing cut, the potatoes being thence carried rearwardly into engagement with the cutting edges 26 of the knife bars 25 for another cut at right angles to the first, if such knife bars be employed, the potatoes finally being discharged into a basket or any other desired receptacle (not shown) arranged underneath the cylinder to receive them.

Preferably I provide guards 30 at the receiving end of the framework and at the ends of the series of fingers 5, the opposing faces of said guards converging rearwardly so as to direct the potatoes to the series of pockets formed by the arrangement of fingers above described. Preferably, also, each knife bar 26 is formed on its upper face with a tapering fin 31 designed to serve as a wedge or separator for the parts of the potato, and at the same time to prevent any bruising of the parts as might happen if they come into contact with a blunt or broad surface at such point. It is preferred that the horizontal slice in the potato be commenced just before the termination of the vertical slice.

From the foregoing description in connection with the accompanying drawings, it will be seen that I have provided an improved construction of potato cutting apparatus or machine which is characterized by simplicity of construction, durability, and efficiency of operation in that the potatoes will be caught up one at a time in succession from the series of fingers 5 and be effectively sliced in an expeditious manner by the continuous rotation of the cylinder 11, the operation being very quickly performed and the capacity of the machine being thereby relatively large.

It is to be understood that the invention is not limited to any number of pickers and their correlated parts. In the present instance, I have shown a machine with twelve pickers, Fig. 7 illustrating diagrammatically the spiral arrangement of the pickers on the periphery of the cylinder 11, it being noted that by the particular arrangement shown, the machine will at all times work toward the center instead of toward either or both ends. This is due to the fact that in the revolution of the cylinder, and the upward sweep of the pickers, taking for example, a picker at the sides of the cylinder as the first in a set, they will be followed in the rotation of the cylinder by pickers that are located in rearwardly converging relation (see Fig. 7), and hence the potatoes will be first picked up from the two sides of the hopper, and the pickers will then gradually work in toward the middle of the hopper, if the two outermost pickers be taken as a starting point in the complete revolution of the cylinder. It will also be seen by referring particularly to Fig. 5, that the pointed extremity 8 of the upwardly turned ends 7 of two coacting fingers 5, serve to widen the discharge opening out of which the potatoes pass as they are picked up from the trough, proper clearance being thereby provided to insure that the potato will not be bruised, or crushed in the operation of the apparatus.

Having thus described the invention, what is claimed as new is:

1. A machine of the character described, comprising a supporting framework, a series of transversely spaced fingers secured in said framework and projecting inwardly and formed with upwardly turned inner ends, every other finger being disposed below its two adjacent fingers, for the purpose specified, a revoluble picker carrier journaled in the framework in the rear of said fingers, pickers secured to said carrier and adapted to sweep upwardly and rearwardly between the fingers, and slicing blades suspended in the framework and coacting with said pickers.

2. A machine of the character described, comprising a supporting framework, a series of transversely spaced fingers secured in said framework and projecting inwardly and formed with upwardly turned inner ends, every other finger extending inwardly of and below its two adjacent fingers for the purpose specified, a revoluble picker carrier journaled in the framework in the rear of said fingers, pickers secured to said carrier and adapted to swing upwardly and rearwardly between the fingers, and slicing blades suspended in the framework and coacting with said pickers.

3. A machine of the character described, comprising a framework a series of transversely spaced fingers secured in said framework and extending rearwardly therein, the rear ends of the fingers being upwardly turned and the upper extremity of every other finger being pointed while the remaining fingers are blunt for the purpose specified, a revoluble picker carrier journaled in the framework at the rear of said fingers, pickers secured to said carrier and adapted to sweep upwardly and rearwardly between two adjacent pointed fingers and an intermediate finger and a slicing blade secured in said framework.

4. A machine of the character described, comprising a supporting framework, a series of transversely spaced fingers secured in said framework and formed with upwardly turned inner ends, every other finger having the upper extremity of such upturned end beveled on its side edges and the remaining fingers extending inwardly beyond and depressed below the just mentioned fingers, a revoluble picker carrier journaled in the framework in the rear of said fingers, pickers secured to and rearwardly between two pointed fingers said carrier and adapted to sweep upwardly and the intermediate longer finger, said pickers being formed with radial slots, and slicing blades suspended in the framework in registry with said slots.

5. A machine of the character described, comprising a supporting framework, a series of transversely spaced fingers secured in said framework and extending rearwardly therein, the rear ends of said fingers being upwardly turned and the upper extremity of every other finger being pointed while the remaining fingers are blunt, such remaining fingers extending rearwardly beyond the other fingers and in a lower plane, for the purpose specified, a revoluble picker carrier journaled in the framework at the rear of said fingers, pickers secured to said carrier, and formed with tines adapted to sweep upwardly and rearwardly between two adjacent pointed fingers and an intermediate finger, said pickers being formed with radial slots, and slicing blades suspended in the framework in registry with said slots.

6. In a machine of the character described, a horizontally disposed revoluble picker carrier mounted to turn about its longitudinal axis, a supporting framework in which said carrier is mounted, a picker formed with a cruciform opening and depending lips along sundry walls of said opening, said picker being secured to the periphery of the cylinder and extending radially therefrom and disposed longitudinally thereon, in combination with knives secured in the framework set at right angles to each other and arranged to register with the oppositely extending portions of said opening.

7. A machine of the character described, comprising a supporting framework, a slatted receiving trough mounted in said framework, a revoluble picker carrier journaled in said framework, pickers secured to said carrier and arranged to sweep upwardly and rearwardly through the trough, substantially vertically disposed slicing blades suspended in the framework, and knife blades secured in the framework and formed with transversely elongated slicing edges in proximity to the rear edges of the first blades, the pickers being adapted to sweep past the knives and blades as and for the purpose set forth.

8. In a machine of the character described, a supporting framework, a receiving trough therefor, a picker carrier mounted in the framework, pickers secured to picker carrier and two sets of slicing knives mounted in the framework, the pickers being adapted to sweep past said slicing devices, one set of the slicing devices being disposed with their slicing edges at right angles to and in proximity to the rear edges of the corresponding knives of the other set.

9. In a machine of the character described, the combination of a revoluble picker carrier, a picker secured thereto and formed with a transversely extending slot, and a knife bar formed with a transversely elongated edge in registry with said slot and with a longitudinally extending fin, as and for the purpose set forth.

In testimony whereof I affix my signature in presence of two witnesses.

EUGENE Q. COUCH. [L. S.]

Witnesses:
   W. N. WOODSON,
   FREDERICK S. STITT.